United States Patent [19]

Lundholm

[11] 4,132,420

[45] Jan. 2, 1979

[54] SEALING RINGS FOR STIRLING ENGINES

[75] Inventor: Gunnar S. K. Lundholm, Lund, Sweden

[73] Assignee: Kommanditbolaget United Stirling (Sweden) AB & Co., Malmo, Sweden

[21] Appl. No.: 641,349

[22] Filed: Dec. 16, 1975

[51] Int. Cl.² .............................................. F16J 9/02
[52] U.S. Cl. ................................. 277/160; 277/194
[58] Field of Search ............ 277/160, 158, 155, 194, 277/195; 92/182

[56] References Cited

U.S. PATENT DOCUMENTS 2,468,980  5/1949  Huber ................................. 92/182
3,893,675  7/1975  Geffroy ............................... 277/194

FOREIGN PATENT DOCUMENTS 176401  10/1953  Austria ................................ 277/158

Primary Examiner—Richard E. Aegerter
Attorney, Agent, or Firm—Laurence R. Brown

[57] ABSTRACT

Sealing rings located in an annular recess about a piston in a Stirling engine have a continuous sealing ring of polymeric material having an L-shaped cross-section producing an annular flange abutment. A second discontinuous polymeric ring has a surrounding resilient steel strip resting against the abutment so that internal pressure cooperates with the two rings to effect a seal.

2 Claims, 4 Drawing Figures

U.S. Patent
Jan. 2, 1979
4,132,420
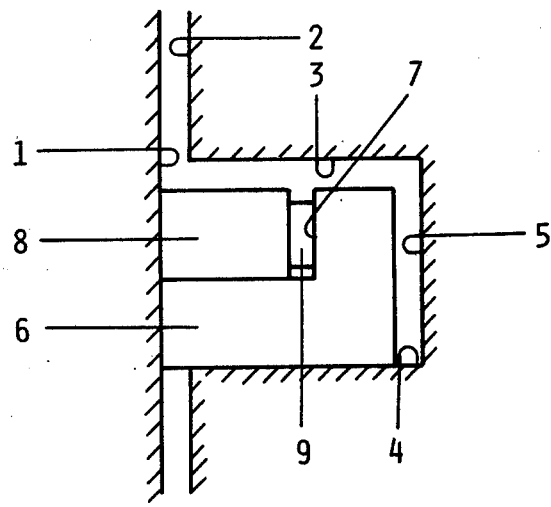
Fig. 1
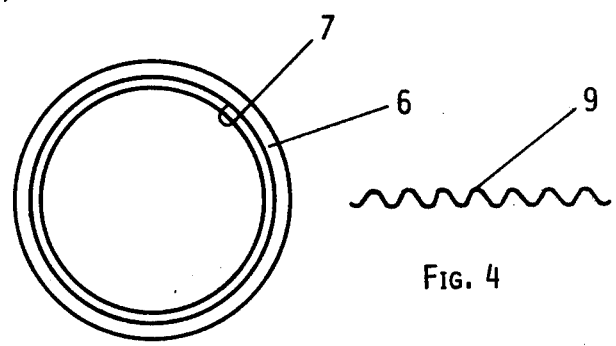
Fig. 2
Fig. 4
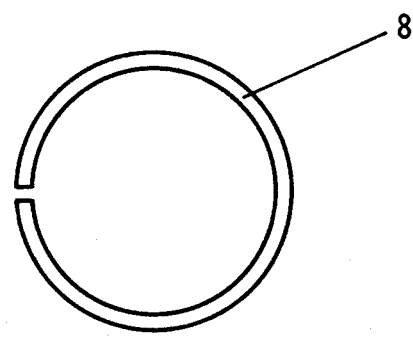
Fig. 3

SEALING RINGS FOR STIRLING ENGINES

This invention relates to a sealing device of the kind (herein called "the kind defined") as used for preventing leakage between two co-axial cylindrical surfaces effecting relative movements in the direction of their common axis, one of said surfaces being concave and surrounding the other one of said surfaces, and the device comprising a continuous sealing ring of polymer material mounted in a groove in a first one of said surfaces and engaging the second one of said surfaces when in normal operation, said groove having a greater dimension than said continuous sealing ring in a direction parallel to the said common axis.

Devices of the kind defined are used, for example, as seals between pistons and cylinder walls. Sealing rings wholly or partially of polymeric material are used in cases where no lubrication with oil is possible, and sealing rings having smaller axial dimensions than the grooves are useful if required to act between a first space containing gas at cyclically varying pressure and a second space containing gas at a pressure corresponding to the minimum value of the pressure in said first space.

As an example of an application a piston seal in a Stirling-cycle engine can be mentioned.

In such an application the continuous sealing ring will change dimensions with changing operating temperature. Thus it may happen that the said continuous sealing ring — due to insufficient diameter when starting a cold engine — will not prevent leakage between the two cylindrical surfaces. This may completely prevent starting the engine.

An object of the present invention is to avoid or mitigate this drawback.

According to the invention there is provided a sealing device of the kind defined herein, characterised in that a discontinuous sealing ring wholly or partially of polymeric material is urged by resilient means into engagement with the said second one of said cylindrical surfaces, the said resilient means being mounted between the discontinuous sealing ring and an abutment provided on the continuous sealing ring.

How the invention may be put into practice is described with reference to the accompanying drawing, in which FIG. 1 is a diagrammatic vertical section through a sealing device according to the invention, and FIGS. 2–4 show details of the device of FIG. 1 to a smaller scale.

FIG. 1 shows the inner cylindrical surface of a cylinder wall of a cylinder, and the outer cylindrical surface 2 of a piston movable relative to the surface 1 in the direction of the common axis of the cylinder and piston.

The piston is provided with a groove limited by an upper horizontal surface 3 and a lower horizontal surface 4 as well as a vertical cylindrical surface 5.

The groove in the piston receives a continuous piston sealing ring 6 made wholly or partially of polymeric material, preferably of fibre-glass-reinforced polytetrafluorethylene. The ring 6 has an L-shaped cross-section providing an abutment in the form of an annular flange with a cylindrical shoulder surface 7. The piston ring 6 has a dimension which is smaller than the length of the surface 5 of the groove in the direction parallel to the common axis of the piston and the cylinder.

A discontinuous ring 8 of the same material as the continuous ring 6 and of the same axial length as the shoulder surface 8 in the direction parallel to the said common axis is held against the surface 1 by a resilient steel strip 9 of undulatory form inserted between the ring 8 and the surface 7. The ring 6 is shown in FIG. 2 as viewed from above at a smaller scale. FIG. 3 shows a similar view of the ring 8, and FIG. 4 shows a portion of the steel strip 9, which may substantially surround the ring 8.

During operation of the device a cyclically varying pressure prevails between the surfaces 1 and 2 above the piston ring 6 and 8, whereas a gas pressure corresponding to the minimum value of said pressure will prevail between the surfaces 1 and 2 under the said piston rings 6 and 8.

The gas pressure will thus tend to force the ring 6 towards the surface 1 and towards the surface 4, thus providing an effective seal against gas leakage across the ring 6. However, it may occur that a gap is formed between the surface 1 and the ring 6. This may be the case if the device is operating at different temperatures or at other temperatures than when the device is in normal operation. The ring 8 will always be in contact with the surface 1, and even if the split ring 8 does not give a complete seal against leakage it will seal sufficiently well to build up a gas pressure behind the ring 6 for forcing said ring 6 towards the surface 1 to establish a very effective seal. The strip 9 ensures that contact is always obtained between the ring 8 and the surface 1.

What is claimed is:

1. A sealing device for use in an annular recession of a piston in a Stirling engine cylinder comprising in combination, a continuous ring of polymeric material having an L-shaped cross section located in said recession, a second discontinuous ring of polymeric material located in said recession adjacent said continuous ring, resilient means mounted between said rings to force said rings apart in a radial direction tending to hold said discontinuous ring in contact with the cylinder wall.

2. A sealing device as defined in claim 1 wherein the resilient device is a metal strip of undulatory form.

* * * * *